United States Patent Office 3,533,735
Patented Oct. 13, 1970

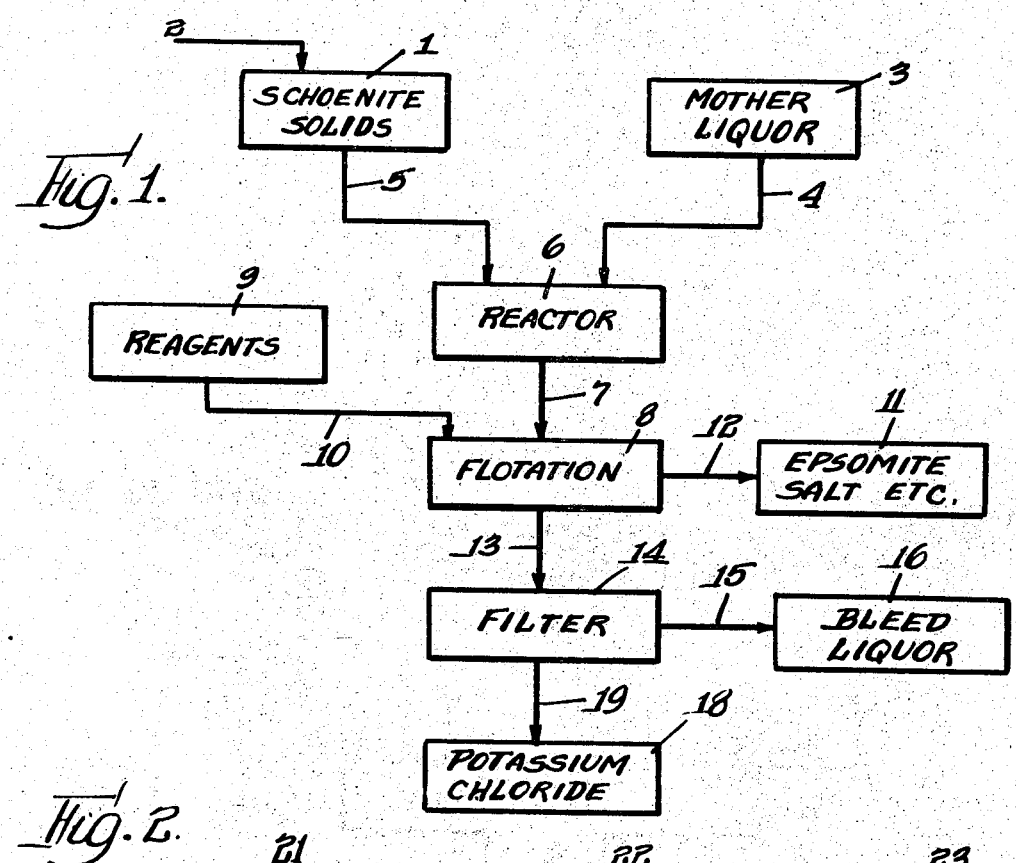
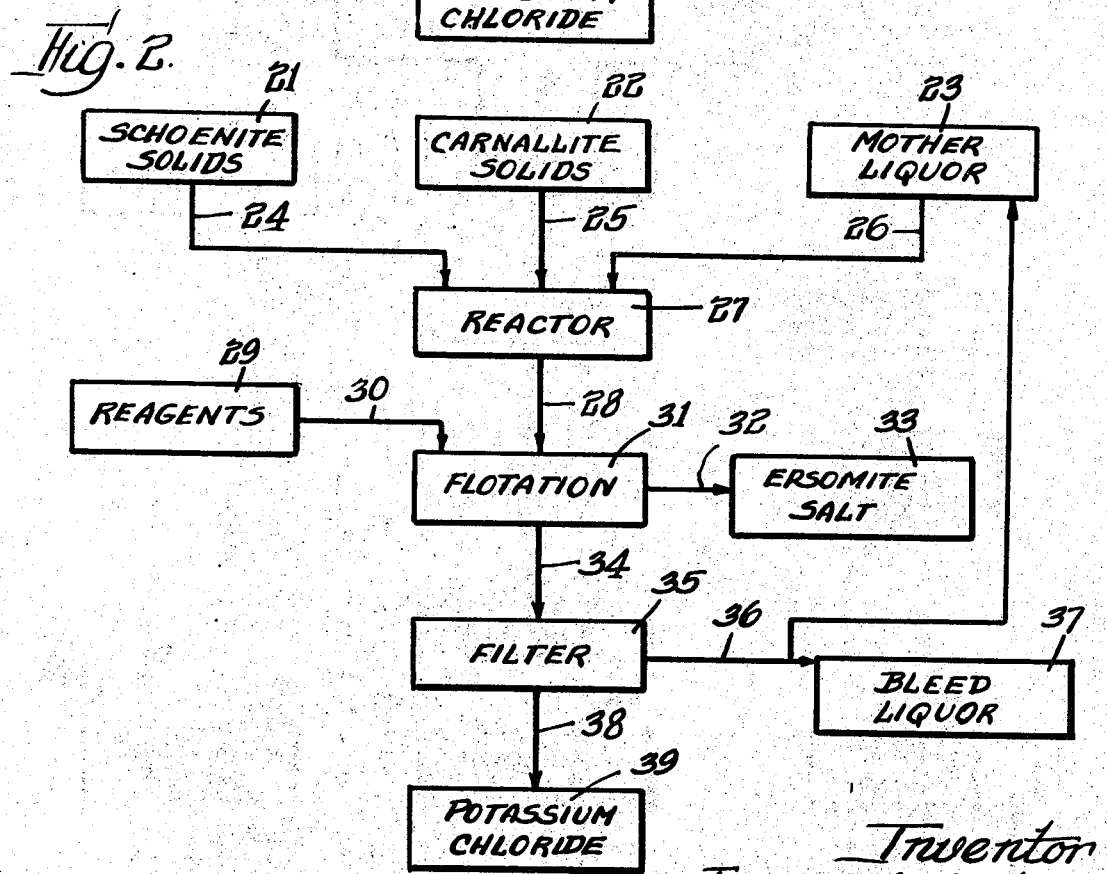

3,533,735
PRODUCTION OF POTASSIUM CHLORIDE FROM SCHOENITE AND FROM BRINES CONTAINING POTASSIUM, MAGNESIUM, CHLORIDE AND SULFATE
Jerome A. Lukes, Claremont, Calif., assignor to Lithium Corporation of America, Inc., New York, N.Y., a corporation of New York
Filed May 13, 1966, Ser. No. 549,866
Int. Cl. C01d 3/06; C01f 5/40
U.S. Cl. 23—89        9 Claims

ABSTRACT OF THE DISCLOSURE

Process for producing potassium chloride and magnesium sulfate hydrate, such as epsomite, from potassium sulfate or from a potassium sulfate double salt by reacting said sulfate, at a temperature not substantially in excess of 34° C., under conditions of agitation, in an aqueous medium which includes magnesium chloride, and separating the said potassium chloride from said magnesium sulfate hydrate.

---

This invention relates to the production of potassium chloride from schoenite or from mixtures containing schoenite and carnallite or from mixtures containing schoenite and magnesium chloride.

Potassium salts formed during the evaporation of sulfatic potassium-containing brines, such as Great Salt Lake brine or sea water, contain exceedingly complex mixtures of potassium salts and other salts. These mixtures may include, for instance, schoenite, kainite, carnallite, glaserite, epsomite, astrakanite, salt and other compounds. Variations in temperature and other climatic conditions may, upon evaporation of such brines, increase or decrease the complexity of the deposited salts, causing the formation of leonite, glauber's salt, and various other salts.

Considerable research and effort has been devoted over a period of many years to the development of procedures to recover potassium chloride from these salts and salt mixtures. Thus, for example, various procedures for producing potassium chloride from carnallite are known, and procedures for producing potassium chloride from kainite are likewise known. Illustrative of such latter procedures is one wherein kainite is reacted with a liquor containing magnesium chloride at an elevated temperature, greater than 90° C., whereby the kainite is converted intermediately to langbeinite, and then the resulting reaction mixture is cooled to a temperature below 25° C. to produce mixtures of schoenite or leonite and potassium chloride or mixtures containing potassium chloride and epsomite, depending upon conditions of operation, and the potassium chloride is then recovered by known procedures.

It has also heretofore been suggested to produce potassium chloride from schoenite but such processes have been uneconomical and unsatisfactory and, therefore, the recovery of potassium values from schoenite, as commercially practiced, has been in the form of potassium sulfate. The utility of potassium chloride as a fertilizer and for other uses makes it highly desirable to be able to recover the potassium values of schoenite as potassium chloride. My invention provides a simple, practical and economical procedure for processing schoenite to yield potassium chloride and, in its particularly preferred embodiments, to recover substantially all of the potassium values from such processing in the form of potassium chloride.

While my invention is particularly useful in connection with the processing of salts deposited during evaporation of brines such as Great Salt Lake brine or generally similar brines or sea water, it is also applicable to the processing of manufactured sulfatic potassium salts or the processing of naturally occurring salts containing one or more potassium sulfate double salts such as schoenite, leonite, langbeinite and glaserite, in admixture with carnallite, kainite, magnesium chloride and other salts, or salts produced by evaporating any potassium-magnesium sulfatic brine. My invention will be described below in connection with the processing of salts obtained by evaporation of Great Salt Lake brine but it will be understood that it is not limited thereto.

In the practice of my invention, broadly speaking, potassium sulfate or potassium sulfate double salts such as schoenite (commonly represented as $$MgSO_4 \cdot K_2SO_4 \cdot 6H_2O)$$

or leonite $(K_2SO_4 \cdot MgSO_4 \cdot 4H_2O)$, langbeinite $$(K_2SO_4 \cdot 2MgSO_4)$$

or glaserite $(3K_2SO_4 \cdot Na_2SO_4)$, are reacted with magnesium chloride (in solid form or in solution) or with carnallite (commonly represented as $KCl \cdot MgCl_2 \cdot 6H_2O$), under the conditions described below, to yield potassium chloride and epsomite. While epsomite is commonly represented as $MgSO_2 \cdot 7H_2O$ the magnesium sulfate formed may be of varying hydration, such as $MgSO_4 \cdot 6H_2O$, $MgSO_4 \cdot 4H_2O$ or any other magnesium sulfate hydrate.

The reaction is carried out in an aqueous medium such as water or, more commonly, a brine liquor containing potassium chloride, sodium chloride, magnesium chloride, magnesium sulfate and the remainder water with small proportions of other salts. The magnesium chloride concentration is greatly in excess, by weight percent, of the concentration of any of the other salts and is also, generally speaking, very substantially in excess, by weight percent, of the total of said other salts, ordinarily of the order of twice or more the amount of the total of said other salts. In the usual case, the magnesium chloride concentration in said brine liquor medium will range from about 16 to 23 percent, by weight, or between 45 and 65 moles/1000 moles $H_2O$ at the end of the reaction. The magnesium chloride used in the reaction may be derived in whole or in part from carnallite or added as such or may be derived in part from the presence or incorporation of carnallite in the reaction mixture and in part from mother liquor sources.

The reactants are mixed and agitated at a temperature not substantially in excess of 35° C. and, better still, in the range of about 15° or 20° to 30° C. until the formation of potassium chloride and epsomite is complete or substantially complete.

Referring, now, to the accompanying drawing, in FIG. 1 I show schematically or diagrammatically the application of my invention to the production of potassium chloride from schoenite (or other potassium sulfate double salts or potassium sulfate). Schoenite solids, which may be separated from salts deposited by evaporation of sulfatic brines such as Great Salt Lake brine, or otherwise obtained as, for instance, by converting kainite or other potash minerals in said salts to schoenite by well-known procedures, or from any other source, are admitted to a chamber 1 by line 2. A suitable mother liquor 3 containing of the general order of about 3% potassium chloride, 2% sodium chloride, 22% magnesium chloride and 5% magnesium sulfate, by weight, the balance mainly water together with small proportions of other salts, is admitted to reactor 6 by line 4 where it is admixed with the schoenite solids passing through line 5. The reactants are advantageously in the range of about 15° to 30° C. until the schoenite has reacted to form potassium chloride solids and epsomite. The reaction products are taken by line 7 to a flotation setup 8, flotation reagents 9 are admitted by line 10 and a flotation by conventional methods is made to separate potassium chloride from epsomite, salt and impurities. Epsomite, salt, impurities and liquor 11 are removed by line 12. The epsomite and salt may, if desired, be separated by known means such as flotation to obtain an epsomite-rich product, or the epsomite and salt may be used in coexisting processing, or discarded. The liquor may be recycled for evaporation or discarded.

Potassium chloride and liquor are taken by line 13 to a filter 14. A centrifuge or other filtering device separates the liquor, which is taken by line 15 to become bleed liquor 16, from the potassium chloride 18 which is taken from the filter by line 19. This potassium chloride 18 may be used directly or treated further by conventional means such as leaching, to effect further purification thereof, followed by a dryer and storage setup.

In FIG. 2 I show schematically or diagrammatically the application of my invention to the production of potassium chloride from a mixture containing schoenite and carnallite. Schoenite solids 21 and carnallite solids 22, which may be obtained from salts deposited during evaporation of brines, such as Great Salt Lake brine, or from any other source, are taken by lines 24 and 25, respectively, to reactor 27. A mother liquor 23, containing of the general order of about 3% potassium chloride, 2% sodium chloride, 22% magnesium chloride and 5% magnesium sulfate, the balance mainly water together with small proportions of other salts, is taken by line 26 to reactor 27. The reactants are mixed and agitated in reactor 27 at a temperature in the range of 15° to 30° C. until the schoenite and carnallite have reacted to form potassium chloride and epsomite.

The reaction products are taken by line 28 to a flotation setup 31. Flotation reagents 29 are added by line 30 and a conventional flotation is made to separate potassium chloride from epsomite and other salts. Epsomite 33 and liquor are removed by line 32. Potassium chloride and liquor are taken by line 34 to filter 35. A centrifuge or other filtering device separates liquor which is returned by line 36 to be used as mother liquor for treating more schoenite and carnallite or to become bleed liquor 37. This mother liquor is essentially unchanged in the process, and consequently may be reused as mother liquor. The potassium chloride 39 is removed from the filter by line 38.

The following examples are further illustrative of the practice of my invention and serve further to point out the important advantages which my invention achieves. It will be understood that these examples are in no way limitative of my invention since various changes can be made without departing from the guiding principles and teachings provided herein.

EXAMPLE 1

Schoenite was mixed and agitated as a 30 wt. percent slurry with an initial (mother) liquor, whose composition is shown in Table I, for one hour at ambient temperature. The product mixture of solids and liquor was filtered and analyzed to determine the final liquor and solids composition which are shown in Table I.

TABLE I.—ANALYSIS, WT., PERCENT

|  | K | Na | Mg | Cl | SO₄ | H₂O |
|---|---|---|---|---|---|---|
| Initial liquor | 1.59 | 0.92 | 6.49 | 19.3 | 3.86 | 67.84 |
| Final liquor | 2.27 | 0.98 | 6.38 | 17.66 | 6.02 | 66.69 |
| Product solids | 16.42 | 0.32 | 5.78 | 15.86 | 21.37 | 40.25 |

On an entrainment-free basis, the composition of the solids was determined as 27.9% potassium chloride, 41.0% epsomite, and 7.7% schoenite. The percentage of schoenite converted to potassium chloride was about 95%.

EXAMPLE 2

A batch operation to react solid schoenite and solid carnallite with a mother liquor was carried out in an agitated reactor. 200 grams of carnallite solids (containing 53.6% carnallite, 11.2% kainite, and 35.2% sodium chloride) and 200 grams of schoenite solids (containing 17.9% potassium and 5.72% magnesium, corresponding to about 93% schoenite), were added to 700 grams of starting liquor of composition shown in Table II.

TABLE II.—ANALYSIS, WT. PERCENT

|  | K | Na | Mg | Cl | SO₄ | H₂O |
|---|---|---|---|---|---|---|
| Starting liquor | 1.46 | 0.84 | 6.71 | 19.69 | 4.40 | 66.90 |
| End liquor | 1.50 | 0.82 | 6.62 | 19.32 | 4.45 | 67.29 |
| −48 +80 mesh product | 8.29 | 11.39 | 5.15 | 27.92 | 17.98 | 29.27 |
| −80 mesh product | 13.01 | 1.10 | 6.50 | 17.29 | 21.08 | 41.02 |

The composition of the −48 +80 mesh product was determined as 18.0% potassium chloride, 33.2% sodium chloride and 48.8% epsomite, while the composition of the −80 mesh products was 32.3% potassium chloride, 3.2% sodium chloride and 64.5% epsomite. Microscopic examination of the −80 mesh product also indicated a predominance of epsomite and potassium chloride. The apparent conversion of schoenite to potassium chloride is substantially 100%.

It is also important to note that the composition of the end liquor is essentially the same as the starting liquor, so that the end liquor may conveniently be used to treat additional schoenite and carnallite to produce potassium chloride.

EXAMPLE 3

A continuous process was carried out, using essentially the same conditions and solids as described in Example 2. Schoenite solids and carnallite solids were each introduced at the rate of 125 grams per minute to an agitated reactor maintained at 25° C. Feed liquor, whose composition is shown in Table III, was introduced at 43 cc./min., and the solids residence time was about one and one-half hours. The reaction was carried out for seven and one-half hours, and during this time the liquor composition remained essentially constant. The end liquor composition is shown in Table III, along with the composition of the product solids. The apparent conversion of schoenite and carnallite to potassium chloride is substantially 100%.

TABLE III.—ANALYSIS, WT. PERCENT

|  | K | Na | Mg | Cl | SO₄ | H₂O |
|---|---|---|---|---|---|---|
| Starting liquor | 1.42 | 0.84 | 6.70 | 19.33 | 4.42 | 67.29 |
| End liquor | 1.70 | 0.91 | 6.73 | 19.13 | 4.56 | 66.97 |
| Solid product | 11.15 | 2.87 | 6.30 | 18.38 | 20.09 | 41.21 |

The solid product was subsequently treated by conventional flotation procedures to separate potassium chloride as shown in Table IV. The yield of the flotation was 78.8%, and the floated product contained 80.5% potassium chloride, 6.4% sodium chloride and 13.1% epsomite.

TABLE IV.—FLOTATION OF PRODUCT

|  | K | Na | Mg | Cl | SO₄ |
|---|---|---|---|---|---|
| Feed, grams | 104.8 | 32.2 | 59.1 | 172.5 | 196.0 |
| Float, grams | 81.6 | 4.9 | 5.4 | 84.8 | 17.1 |
| Residue grams | 21.9 | 29.7 | 53.4 | 84.9 | 185.5 |

I claim:

1. A process for producing potassium chloride and magnesium sulfate hydrate from potassium sulfate or at least one potassium sulfate double salt which comprises reacting said salt, at a temperature not substantially in excess of 35° C., under conditions of agitation, in an aqueous reaction medium which includes magnesium chloride, said reaction medium containing between about 16% and 23%, by weight, of magnesium chloride and said magnesium chloride being substantially in excess, by weight percent of the total of the other salts present in said reaction medium, and separating the potassium chloride from said magnesium sulfate hydrate.

2. A process according to claim 1, in which the reaction temperature is in the range of about 15° to 30° C.

3. A process according to claim 1, in which the potassium sulfate double salt is at least one of the group of schoenite, leonite, langbeinite and glaserite.

4. A process according to claim 1, in which the reaction medium contains carnallite.

5. A process according to claim 1, in which the magnesium chloride is derived in part from carnallite.

6. A process according to claim 4, in which the potassium sulfate or the potassium sulfate double salt and the carnallite are employed in the form of solids.

7. A process according to claim 1, in which the reaction medium comprises a magnesium chloride mother liquor containing between about 16% and 23%, by weight of magnesium chloride, with substantially smaller proportions of potassium chloride, sodium chloride and magnesium sulfate.

8. A process according to claim 7, in which said magnesium chloride mother liquor contains approximately, by weight, 3% potassium chloride, 2% sodium chloride and 5% magnesium sulfate.

9. A process according to claim 1, in which the mixture of the potassium chloride and the magnesium sulfate hydrate produced are separated by flotation and filtering to obtain solid potassium chloride and magnesium sulfate hydrate.

References Cited

UNITED STATES PATENTS

| | | | |
|---|---|---|---|
| 2,733,132 | 1/1956 | Burke | 23—128 |
| 2,895,794 | 7/1959 | Dancy et al. | 23—128 XR |
| 2,902,343 | 9/1959 | Saccardo | 23—89 XR |
| 3,003,849 | 10/1961 | Veronica | 23—128 XR |
| 3,099,528 | 7/1963 | Hadzeriga | 23—89 |
| 3,198,601 | 8/1965 | Veronica et al. | 23—128 XR |
| 3,268,289 | 8/1966 | Macey | 23—89 |
| 3,342,548 | 9/1967 | Macey | 23—89 |
| 3,352,633 | 11/1967 | Nylander | 23—89 |

OTHER REFERENCES

J. W. Mellor's book "A Comprehensive Treatise on Inorganic and Theoretical Chemistry," vol. 2, 1922 ed., p. 66, Longmans, Green & Co., New York.

McPherson & Henderson book "A Course in General Chemistry," third ed., (1927), pp. 303–306, 308 and 309, Ginn & Co. New York.

EDWARD STERN, Primary Examiner